(12) United States Patent
Long et al.

(10) Patent No.: US 7,244,459 B2
(45) Date of Patent: Jul. 17, 2007

(54) SHOCK WAVE TREATMENT OF MEAT

(75) Inventors: John Long, Sarasota, FL (US); Peter Thomsen, Richland, WA (US); Don Waits, El Cerrito, CA (US)

(73) Assignee: Hydrodyne Incorporated, Sarasota, FL (US)

( * ) Notice: Subject to any disclaimer, the term of this patent is extended or adjusted under 35 U.S.C. 154(b) by 284 days.

(21) Appl. No.: 10/714,908

(22) Filed: Nov. 18, 2003

(65) Prior Publication Data

US 2004/0097180 A1 May 20, 2004

Related U.S. Application Data

(60) Provisional application No. 60/473,921, filed on May 29, 2003, provisional application No. 60/426,825, filed on Nov. 18, 2002.

(51) Int. Cl.
*A22C 9/00* (2006.01)
(52) U.S. Cl. .................. 426/238; 426/246; 426/641; 99/451; 99/DIG. 12; 422/20; 422/127; 422/128
(58) Field of Classification Search ............... 426/281, 426/506, 513, 237–238, 246, 641–647, 234; 99/451, 467, 485, DIG. 12; 422/20, 39, 422/127–128
See application file for complete search history.

(56) References Cited

U.S. PATENT DOCUMENTS

| | | | |
|---|---|---|---|
| 2,078,641 A | 4/1937 | Spencer | |
| 2,544,681 A | 3/1951 | Harsham et al. | |
| 2,830,912 A | 4/1958 | Simjian | |
| 2,880,663 A | 4/1959 | Simjian | |
| 2,881,080 A | 4/1959 | Simjian | |
| 2,902,712 A | 9/1959 | Simjian | |
| 2,980,537 A | 4/1961 | Hagen | |
| 3,220,873 A | 11/1965 | Wesley | |
| 3,389,997 A * | 6/1968 | Merton | 530/377 |
| 3,492,688 A | 2/1970 | Godfrey | |
| 3,594,115 A * | 7/1971 | Wesley et al. | 422/22 |
| 3,611,766 A | 10/1971 | Klein et al. | |
| 3,711,896 A * | 1/1973 | Guberman et al. | 452/141 |
| 3,743,523 A | 7/1973 | Bondie | |
| 3,876,373 A * | 4/1975 | Glyptis | 422/23 |
| 3,961,569 A | 6/1976 | Kenyon et al. | |
| 4,135,002 A * | 1/1979 | Hodges et al. | 426/482 |
| 4,353,928 A | 10/1982 | Seliger et al. | |
| 4,458,153 A | 7/1984 | Wesley | |
| 4,464,401 A | 8/1984 | Kissam | |
| 4,496,594 A | 1/1985 | Miyahara | |
| 4,504,498 A | 3/1985 | Kissam | |

(Continued)

OTHER PUBLICATIONS

Claus, James, Dr. "Instantaneous tenderization using an electrically generated shock wave (The TenderClass™ System)", pre-publication date Nov. 15, 2002, publication date unknown.

*Primary Examiner*—Drew Becker
(74) *Attorney, Agent, or Firm*—Browdy and Neimark, PLLC

(57) ABSTRACT

A system for treating meat by the application of a shock wave to the meat while the meat is in contact with a diaphragm which is substantially transparent to the shockwave, confines the meat within a tunnel. In addition, the diaphragm and shock wave generating chamber are preferably disposed above the meat.

13 Claims, 3 Drawing Sheets

U.S. PATENT DOCUMENTS

| | | |
|---|---|---|
| 4,522,834 A | 6/1985 | Miyahara |
| 5,026,484 A | 6/1991 | Juvan |
| 5,256,430 A | 10/1993 | Suzuki et al. |
| 5,273,766 A | 12/1993 | Long |
| 5,328,403 A | 7/1994 | Long |
| 5,368,724 A | 11/1994 | Ayers et al. |
| 5,397,961 A | 3/1995 | Ayers et al. |
| 5,588,357 A | 12/1996 | Tomikawa et al. |
| 5,611,993 A | 3/1997 | Babaev |
| 5,841,056 A | 11/1998 | Long et al. |
| 6,120,818 A | 9/2000 | Long |
| 6,146,262 A | 11/2000 | Long et al. |
| 6,168,814 B1 | 1/2001 | Long |
| 6,200,615 B1 | 3/2001 | Long |
| 6,206,773 B1 | 3/2001 | Waits |
| 6,224,476 B1 * | 5/2001 | Long et al. .................. 452/141 |
| 6,264,543 B1 | 7/2001 | Garcia et al. |
| 6,306,029 B1 | 10/2001 | Long |
| 6,669,546 B2 * | 12/2003 | Long .......................... 452/141 |
| 2002/0072318 A1 | 6/2002 | Long |

* cited by examiner

SHOCK WAVE TREATMENT OF MEAT

FIELD OF INVENTION

The present invention relates to an improved system for tenderization of meat using a shock wave, and is a variation of the system of U.S. application Ser. No. 10/005,763, corresponding to U.S. application publication US 2002-0072318-A1, now U.S. Pat. No. 6,669,546, the subject matter of which is hereby incorporated by reference. The benefit of U.S. provisional applications 60/426,825, filed Nov. 18, 2002, and Ser. No. 60/473,921, filed May 29, 2003, is claimed.

BACKGROUND OF THE INVENTION

Early attempts to commercialize a shock wave tenderization system were based on the controlled detonation of chemical explosives in a water-filled vessel in which the meat was submersed (Godfrey, U.S. Pat. No. 3,492,688; Long, U.S. Pat. No. 5,273,766). Although significant tenderization was documented using a chemical explosive-based technology according to Long '766, a number of technological limitations existed with this approach. With the chemical explosive-based system, the meat was packaged to avoid contact with the water potentially containing chemical residue from the explosion; vacuum packaging resulted in complete absence of air, even minute bubbles, and was desired because the rapid pressures generated by the shock wave would cause bag failures, thus exposing the meat to the water in the vessel and to potential combustion products from the explosives.

Also, the high infrastructure costs and the lack of the ability to optimize the process for specific muscle types inhibited the commercialization of a chemical explosive-based system.

Subsequently, a novel concept was developed in which a shock wave could be electrically generated with a capacitor discharge system (e.g. Long, U.S. Pat. No. 6,120,818). Since that time a number of improvements have been developed.

A muscle cell is about the diameter of a human hair and contains about 1000–2000 myofibrils. After treatment according to the present invention and earlier embodiments, transmission electron micrographs (TEM) at 19,500X show jagged tear lines along the myofibrils which suggest physical tearing of the myofibrils rather than proteolysis. The bonds of the meat proteins associated with the Z-line and the thin filaments appear to be highly susceptible to physical shock wave tenderization as carried out according to the present invention and earlier embodiments.

BRIEF DESCRIPTION OF THE INVENTION

The present invention is based on the system of Long U.S. applications Ser. No. 10/005,763 (publication US-2002-0072318-A1), 60/426,825 and 60/473,921, the contents of which are hereby incorporated by reference.

Boneless, unpackaged meat is indexed into a processing tunnel. There the meat is in contact with a diaphragm which separates the processing tunnel from the water-filled capacitor discharge and shock wave generating chamber. The diaphragm is made of a material that is substantially invisible to the shock wave as disclosed in Long 10/005,763, i.e. the diaphragm has an acoustic impedance which is substantially the same as the fluid in the shock wave generating chamber and the meat to be treated, and is preferably natural gum rubber, polyurethane or another synthetic elastomer.

The shock wave is generated by creating a high-voltage arc across two electrodes immersed in the non-compressable fluid, preferably water. The shock wave crosses the diaphragm and passes into the meat. As the shock wave goes through the meat it deposits energy and breaks bonds in selective myofibrillar proteins responsible for the structural integrity of the muscle. Tenderization occurs in a fraction of a millisecond.

The amount of energy used to create a given shock wave can be dialed in as a percentage of the capacitors' capability. In addition, the meat can be easily exposed to more than one shock wave pulse because the capacitors can be rapidly cycled, e.g. every two seconds.

In accordance with one aspect of the present invention, an air gap is provided downstream of the meat from the direction of travel of the shock wave in order to produce a tension or rarefaction wave, which air gap is optimally at least 1.9 cm high, preferably backed by a metal plate to limit the excursion of the meat.

A further improvement passes the meat through a substantially sealed "tunnel". The space containing the meat is provided with the previously disclosed rubber diaphragm between the approaching shock wave and the meat, e.g. at the bottom when the shock wave approaches from below, a metal wall opposite the wall formed by the diaphragm through which the shock wave passes, solid and preferably metallic end walls, and solid sides (preferably of polyurethane) which are transparent to the shock wave thus producing a tension or rarefaction wave. The end walls, preferably metal plates, are placed at either end of the tunnel chamber to contain the meat.

In another embodiment, the meat is completely sealed in the tunnel which is provided with solid sides formed of shock reflective material, preferably strong metal, e.g. stainless steel, in addition to the metal wall opposite the wall formed by the diaphragm and the shock reflective end walls, thus providing a sealed tunnel wherein no tension or rarefaction wave is produced.

In use, the top and/or one or more ends of the tunnel is/are moved such as by an hydraulic ram or the like to compress the meat in the tunnel chamber in an attempt to eliminate air pockets in the meat, resulting in substantial reduction of such voids. Tenderization using this system has achieved excellent results, better than anything previously attempted, with little damage to the meat.

To substantially entirely eliminate any damage to the meat, the walls of the tunnel chamber, hereinafter sometimes called the meat treatment chamber, are constructed without any gaps therebetween, preferably by welding, to prevent extrusion of meat through such gaps when the meat is hit by the shock wave. Movable end walls of the tunnel are provided with self energizing seals.

Using this system, the meat is contained substantially within a metal box, acting as the meat treatment chamber, with substantially no voids, the top or bottom and the two end walls of which are metal, with two of the side walls being formed of a material strong enough to survive the loading and transparent to the shockwave, or also being formed of metal, it being understood that the wall of the box opposite the metal top or bottom comprise the diaphragm (previously disclosed) which transmits the shock wave to the meat, when the electrodes, located upstream of the diaphragm, are shot. This produces excellent tenderization with little or no damage to the meat.

According to the present invention, the water-filled shock wave generating chamber is preferably placed above the diaphragm with the processing tunnel therebelow. As a result, bubbles generated in the water as a result of the high voltage arc to create the shock wave do not accumulate adjacent the diaphragm whereby removal of such bubbles would become necessary in order to maintain high efficiency of the tenderization process in the non-preferred alignment wherein the shock wave generating head is below the diaphragm and meat.

Also provided is a meat delivery and removal system. The meat, in random orientation as it is received from a plant conveyor, enters at one end, then first goes through a meat alignment station that arranges the meat in proper orientation, e.g. in one embodiment three pieces of meat, aligned side-by-side, are spaced with about 30.5 cm between rows of meat. This spacing is selected in this embodiment so that the system can receive 61 cm long pieces of meat, such as pork loins, and of course smaller pieces of meat, such as eye of round of 30.5 cm length. Other arrangements and dimensions are of course possible.

The meat is transported longitudinally by a conveyor to a first location, then pushed sideways at 90° to a second location so as to effect sidewards compression of the meat and squeezing out of air bubbles, then translated longitudinally by pushing to the treatment zone in the original direction of travel. In the treatment zone, the meat is squeezed between the two end walls. After treatment, it is then pushed longitudinally to a fourth zone, then pushed laterally at 90° to a fifth zone where it is carried away by a second conveyor. In this embodiment, the meat being processed moves in four-second cycles between shock wave pulses, but of course other sequences can be selected.

DETAILED DESCRIPTION OF THE INVENTION

Figure 1:
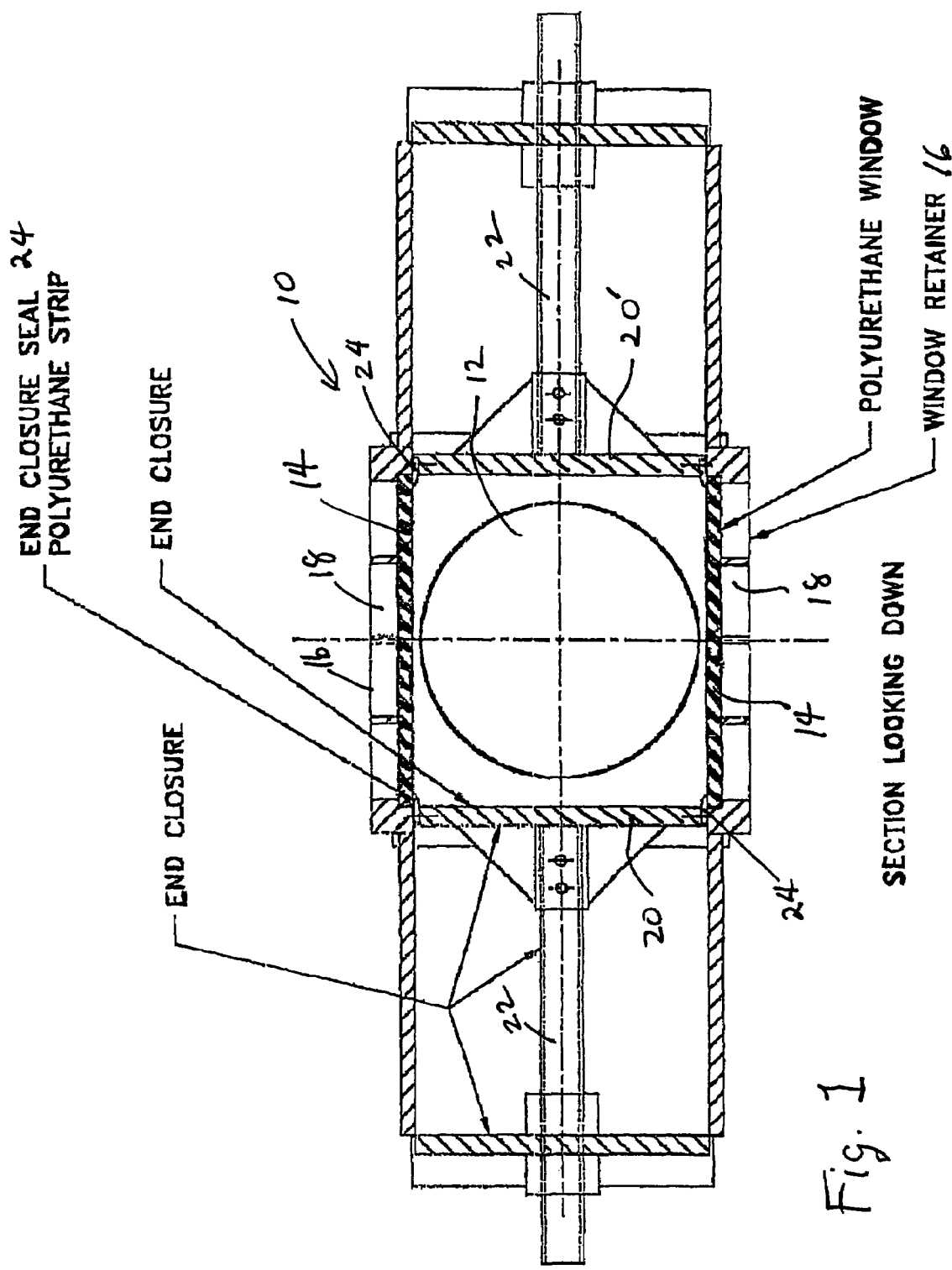
FIG. 1 is a horizontal cross-section of a first embodiment according to the present invention.

FIG. 1 is a horizontal cross section of a first device 10 according to present invention and consistent with the system of the aforementioned Long US-2002-0072318-A1, with however the following additional features and/or variations. The meat treatment zone 12 is provided with two polyurethane sidewalls 14 each being backed up by a suitable window retainer 16 of strong material such as steel, but which provides an air gap 18 therebehind, suitably of a thickness of preferably at least 1.5 cm, and more preferably at least 2 cm.

Two end walls 20 and 20' are provided which are movable longitudinally and driven by suitable hydraulic or pneumatic rams (not shown) or by an electric motor or other suitable means (not shown) through rods 22. When the meat is placed in the meat treatment zone 12, the end walls serve to squeeze the meat together so as to eliminate or at least minimize air bubbles in the meat and to form the meat treatment chamber.

To prevent the meat from extruding between gaps adjacent the edges of the end walls 20, 20', suitable seals 24, formed for example of polyurethane strip material, are provided. The end plates 20, 20' are suitably formed of stainless steel and have a thickness of at least about 1.25 cm. In one embodiment, such end walls 20, 20' were about 30.5 cm wide and about 7.6 cm high.

Below the meat is provided a diaphragm and below the diaphragm is provided the capacitor chamber as disclosed in Long US-2002-0072318-A1. Above the meat is a metal plate (not shown) movable downward in a manner similar to the end walls 20, 20', also for compressing the meat and minimize or eliminating air bubbles in the meat.

In use, this system worked well, but the walls must be sturdy. As the result of a single shot, stainless steel end walls 20, 20' of thickness about 1.25 cm were bowed out by about 1.6 cm. Therefore, thicker walls are desirable, e.g. 2.54 cm. The polyurethane side walls 14 were not damaged. These results indicate that the force was from the shock wave rather from any hydrostatic pressure resulting from upward movement of the diaphragm. Meat tenderization was excellent using this system.

In a variation or other embodiment, the side walls 14' (see FIG. 3), like the end walls 20, 20', are formed of metal plates, preferably stainless steel, also having a thickness of greater than 1.25 cm, e.g. 2.54 cm. In this alternate embodiment, no wall downstream of the diaphragm is transparent to the shock wave, and therefore no rarefaction or tension wave is produced.

Figure 2:
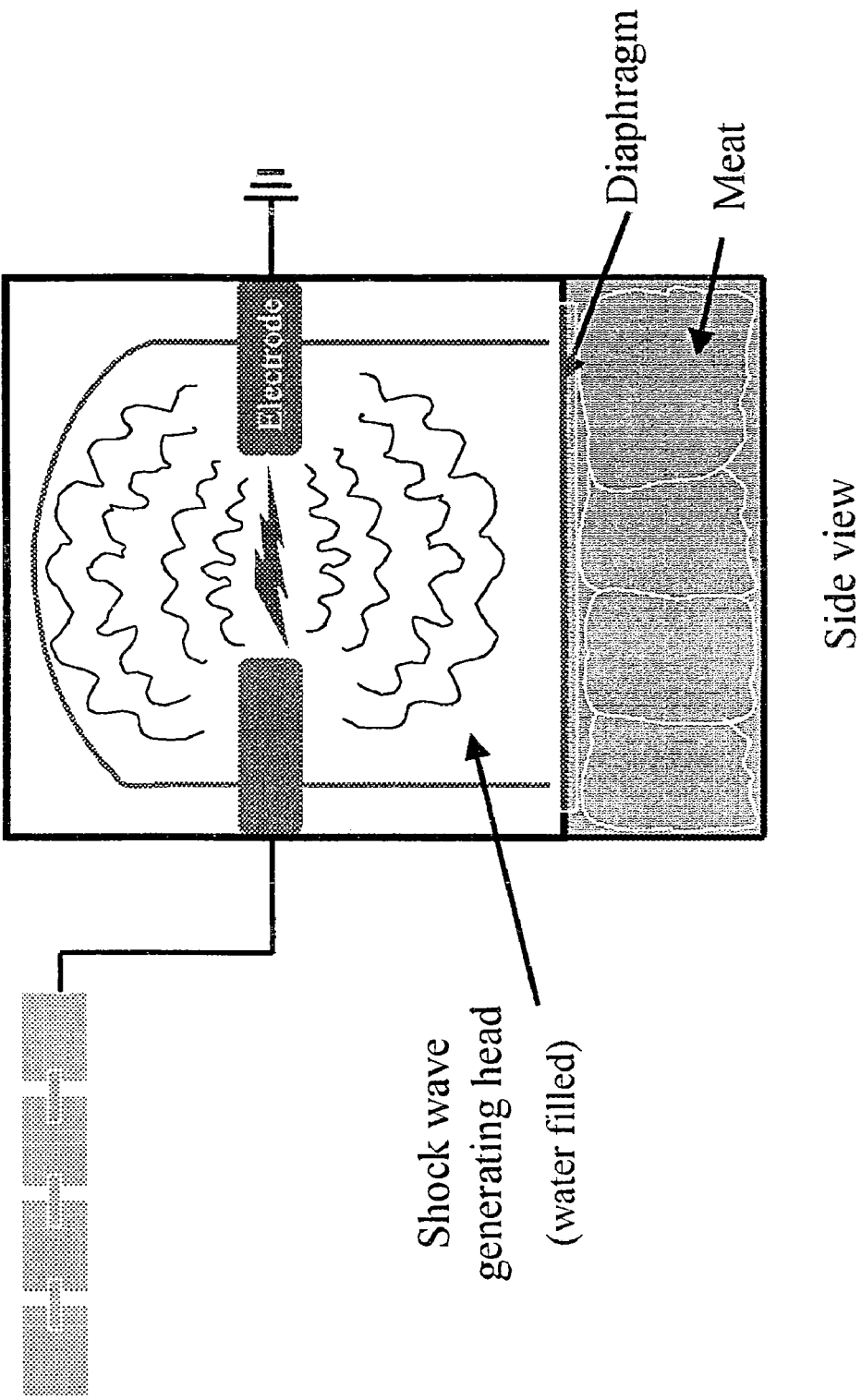
FIG. 2 is a schematic side view of an arrangement according to the present invention wherein the capacitor discharge chamber is located above the meat rather than therebelow.
Figure 3:
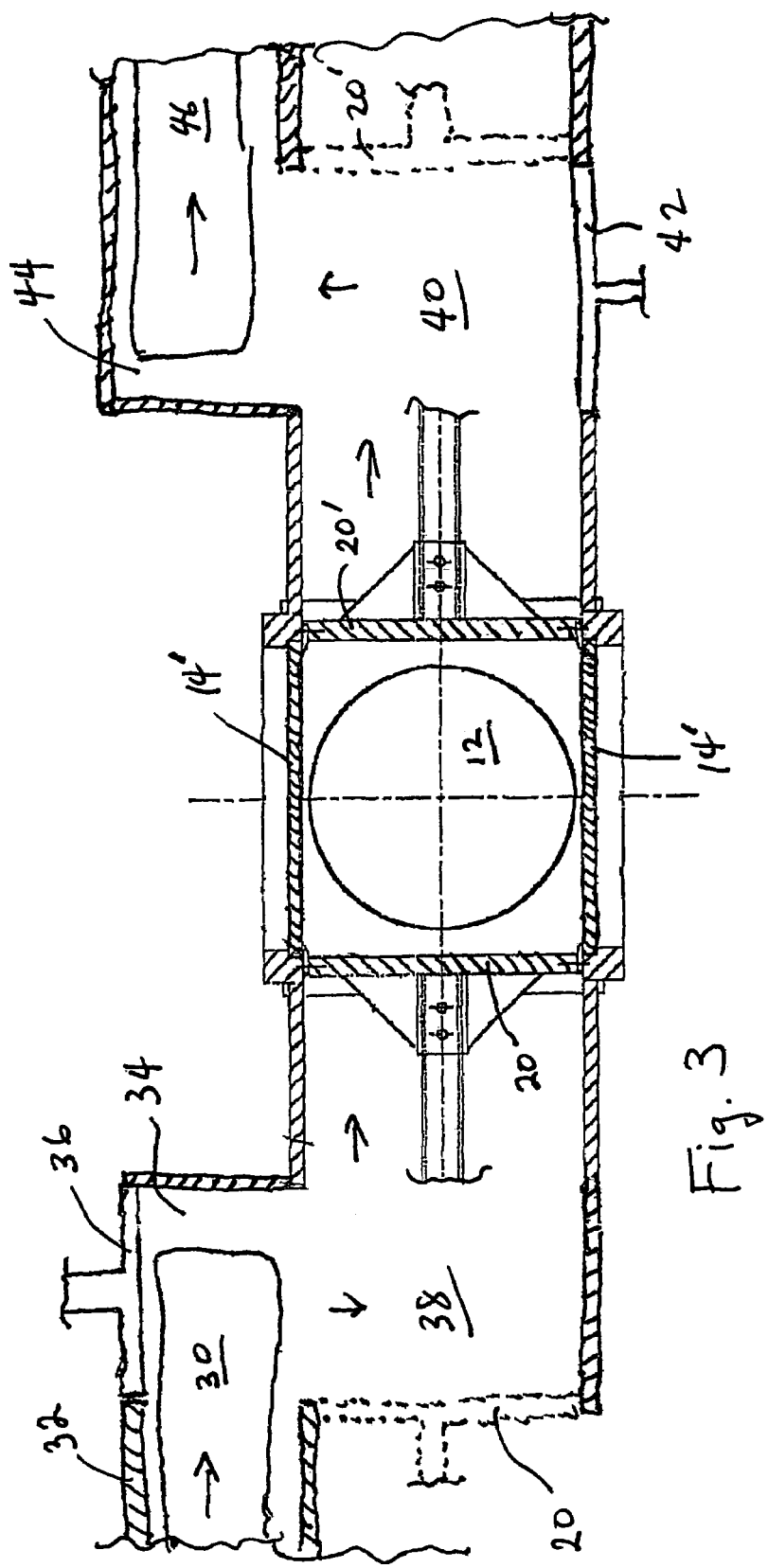
FIG. 3 is a schematic horizontal sectional view of a further variation.

FIG. 2 schematically illustrates an improvement which can be used with the embodiments of FIG. 1 or FIG. 3, or with any of the earlier embodiments including those disclosed in Long US-2002-0072318-A1. In this embodiment, as clearly illustrated in FIG. 2, the capacitor discharge chamber is located above the diaphragm and the meat treatment chamber so that the weight of the liquid within the capacitor discharge chamber thereabove pushes downwardly on the diaphragm which in turn pushes downwardly on the meat. This variation has the advantage of avoiding the accumulation of bubbles adjacent the diaphragm, which bubbles are generated in the water as a result of the high voltage arc which creates the shock wave; instead the bubbles rise to the top of the capacitor discharge chamber where they cause no harm.

A variation of the embodiment of FIG. 1 is shown schematically in FIG. 3 wherein like parts consistent with FIG. 1 are given like reference numerals.

In the variation of FIG. 3, meat is fed to the system along a conveyor 30 through an initial tunnel section 32 to a first zone 34 in a longitudinal direction. At the first zone 34, the meat is then pushed laterally by a ram 36, driven hydraulically, pneumatically or electrically, or any other way, to a second zone 38 adjacent the upstream end wall 20 described above in conjunction with FIG. 1, in the position shown in phantom in FIG. 3. Such end wall 20 then pushes the meat to the treatment zone 12 were it is confined between the preferably metallic side walls 14', the end wall 20, and the end wall 20' which has moved from the position shown in phantom.

After the meat has been treated, the end wall 20' is moved back to the position shown in phantom and the end wall 20 is further advanced to push the meat to a fourth zone 40. Another ram 42 is then activated to push the meat from zone 40 to a fifth zone 44 and onto another conveyor 46 which carries the treated meat away.

EXAMPLE 1

Beef and Pork Results

The results presented below are from a number of different system configuration changes according to earlier embodiments and the present invention were being developed and tested. A variety of beef end cuts were tenderized. Beef top rounds were improved in tenderness by 19 to 28% (Table 1, wherein "TCS" designates shock wave treatment according to the present invention or earlier embodiments).

Relative to data presented in the 1998 National Beef Tenderness Survey, this reduction in shear was even greater than the difference in shear force between USDA Select and Choice grade beef (0.34 kg).

which demonstrates that the tenderization is uniform across the length of the roast as well as at vertical locations within the roast.

Fresh pork was tenderized by an average of 28% using shock wave treatment (Table 1). Eleven of twelve loins responded positively to shock wave tenderization. Also the shock wave treated pork was more consistent in tenderness. Another set (n=10) of fresh pork that was obtained from a different commercial packer and shock wave processed (80% energy, single pulse) resulted in a 20% reduction in the shear force (WBS control 3.4 kg vs. shock wave treated 2.7 kg). Preliminary data suggest that the present system may improve injection uptake (control 14.8 vs. shock wave treated 17.0%) and subsequent reduction in drip loss (1.8 vs. 1.5%) of enhanced pork chops.

EXAMPLE 2

Chicken Results

The initial application of shock wave treatment was centered around providing poultry processors the ability to eliminate the need to age broiler breasts on the front halves.

TABLE 1

Warner-Bratzler shear averages in kilograms (Kg) and standard deviations for Shock wave treated beef top rounds and pork loins

| | Individual muscles | | | | | | | | | | | | | |
|---|---|---|---|---|---|---|---|---|---|---|---|---|---|---|
| Species and cut | 1 | 2 | 3 | 4 | 5 | 6 | 7 | 8 | 9 | 10 | 11 | 12 | Avg. | % change |
| Beef-top rounds | | | | | | | | | | | | | | |
| Control | 5.4 | 5.6 | 3.3 | 6.4 | 4.7 | 7.1 | 6.2 | 5.1 | 6.6 | — | — | — | 5.6 | |
| TCS 76%, 1 pulse | 5.0 | 4.7 | 3.9 | 5.1 | 4.0 | 6.7 | 2.7 | 4.2 | 4.4 | — | — | — | 4.5 | 19.2 |
| Control | 5.7 | 6.2 | 5.9 | 6.1 | 4.2 | 5.1 | 5.9 | 4.4 | — | — | — | — | 5.4 | |
| TCS 72%, 3 pulses | 3.1 | 4.7 | 3.1 | 5.1 | 3.8 | 3.8 | 4.4 | 3.3 | — | — | — | — | 3.9 | 28.0 |
| Pork-loins | | | | | | | | | | | | | | |
| Control | 3.1 | 4.9 | 3.5 | 5.3 | 5.8 | 3.2 | 4.5 | 5.0 | 3.3 | 2.7 | 3.6 | 4.9 | 4.2 | |
| TCS 72%, 2 pulses | 1.8 | 2.5 | 2.2 | 6.2 | 3.6 | 1.7 | 3.1 | 4.2 | 2.5 | 2.4 | 2.7 | 2.9 | 3.0 | 28.1 |

Warner-Bratzler Shear on 1/2 " diameter cores.

Another benchmark used to define acceptability in tenderness is a shear force of less than 4.6 kg. Therefore, the average tenderness of the top rounds was improved from unacceptable to acceptable in tenderness. Beef eye of rounds were improved in tenderness by an average of 18.6 to 29% (WBS 4.5 kg control, compared to 3.4 to 3.7 kg after shock wave tenderization) depending on the number of pulses. The application of the shock wave (60% energy, one pulse) improved the average tenderness (WBS) of beef strip loins (control 4.5 kg vs shock wave treated 3.4 kg) to a level at least equal to blade tenderization (3.5 kg) but without the concern with microbial penetration.

Shock wave treated beef resulted in more tender enhanced eye of rounds (WBS control 4.1 vs. shock wave treated 3.2 kg). Without making any adjustments to the injector after being set at 10%, shock wave treated processed eye of rounds picked up 15% liquid, e.g. marinade, compared to the controls (10%). See PCT/US03/02514. In addition, 5-day drip loss was reduced (control 3.6% versus Shock wave treated 2.6%). Shock wave processed beef was less red (CIE $a^*$ values) most likely due to the higher injection as no differences have been observed in fresh beef. Similar results were documented for bottom rounds and top rounds used to produced enhanced beef. Testing has also been completed Results indicated that an acceptable level of tenderness was achieved in the chicken breasts that were immediately deboned and shock wave processed after the muscle was setup into rigor (Table 2, set 2). The early deboned breasts, shock wave processed at 6 hours postmortem, were very close to an acceptability threshold (6.0 kg). Coupling electrical stimulation with shock wave treatment has the potential to eliminate the need to age broiler breasts.

TABLE 2

WBS[a] values on early deboned (exiting chiller) breasts shock wave processed using various pulses, energies, and times postmortem

| | Set 1 | | Set 2 | |
|---|---|---|---|---|
| | Control | Shock wave treatment 80% 2 pulses 6 hr PM | Control | Shock wave treatment 80% 2 pulses 24 hr PM |
| Average | 17.2 | 6.9 | 13.4 | 4.1 |
| Std. dev | 5.1 | 3.2 | 4.9 | 1.7 |

[a]WBS shear values obtained from convection oven cooked breasts and 1.9 cm wide strips.

Another aspect worth considering is the fact that even in poultry plants that are "aging" the front halves of the chickens prior to deboning, inconsistencies and inadequate tenderness exist in the market. A wide range in aging times before deboning exists among the various poultry companies. In addition, the general trend is for the poultry plants to continue to shorten the aging time as much as possible in order to reduce storage space. The shorter storage time results in a higher percentage of breasts exhibiting tenderness problems, i.e. undesirable toughness of "rubbery" chicken. If the tenderness of normally produced chicken breasts is not at the desired level, then shock wave treatment has been shown to improve the tenderness.

Shock wave treatment has many advantages, and the present invention improves the ease and consistency of shock wave treatment. Consumers continue to look for leaner cuts of meat. Unfortunately such cuts often have problems with tenderness. Shock wave treatment improves the tenderness of lean fresh boneless beef without the need for aging and without compromising the surface integrity of the meat (e.g. bacterial penetration). Tenderization can be optimized by the type of cut because of the ability to easily select the shock wave energy and the number of pulses to which the meat is exposed. The tenderness of pork, beef, chicken, and other species is improved.

By shock wave processing meat, marinade uptake can be increased in enhanced beef and pork. See PCT/US03/02514.

Tenderization is provided without altering other desirable quality attributes of the meat (e.g. color, appearance, texture, flavor).

A complete system can easily be installed in-line in existing meat processing and case-ready facilities. A single apparatus according to the present invention has a floor footprint of about 9.2 $m^2$ and will process approximately 6,135 Kg of meat per hour.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. In a method of tenderizing meat and/or killing microbes in meat, comprising
    subjecting meat to a shock wave propagated through a incompressible fluid, wherein
    said meat is placed adjacent a first surface of a diaphragm having an acoustic impedance approximately the same as the acoustic impedance of said incompressible fluid, said incompressible fluid lying adjacent a second surface of said diaphragm, said diaphragm separating said meat from said incompressible fluid; and
    wherein movement of said meat is restricted when subjected to said shock wave passing through said incompressible fluid and then through said diaphragm and into said meat;
    the improvement wherein
    said meat is confined, compressed to attempt to eliminate any air pockets in the meat, and tightly sealed within a tunnel while being subjected to said shock wave.

2. The method according to claim 1, wherein the meat is confined, during said shock wave treatment, in a space having a metal top or bottom, sidewalls which are substantially transparent to the shockwave, metal ends, and said diaphragm through which the shock wave initially passes, said diaphragm being located opposite said metal top or bottom.

3. The method of claim 2 wherein said side walls are formed of polyurethane.

4. The method according to claim 1, wherein the meat is confined, during said shock wave treatment, in a space having metal top or bottom, side walls and end walls which are metal, and said diaphragm through which the shock wave initially passes, said diaphragm being located opposite said metal top or bottom.

5. The method of claim 1 wherein said diaphragm is located above the meat and the shock wave passes downwardly through the diaphragm and into the meat.

6. The method of claim 2 wherein said diaphragm is located above the meat and the shock wave passes downwardly through the diaphragm and into the meat.

7. The method of claim 4 wherein said diaphragm is located above the meat and the shock wave passes downwardly through the diaphragm and into the meat.

8. In an apparatus suitable for carrying out the method of claim 1, comprising
    a chamber for containing an incompressible fluid having a first acoustic impedance, and a device for generating a shock wave within the incompressible fluid in said chamber;
    the diaphragm being disposed adjacent said chamber, said diaphragm having one surface adapted to be in contact with the incompressible fluid within said chamber when said apparatus is in use, said diaphragm having an opposite surface adapted to be in contact with the meat when the apparatus is in use, and said diaphragm having an acoustic impedance approximately the same as said first acoustic impedance; and
    structure for restraining excessive movement of the meat when subjected to a shock wave passing through the incompressible fluid and then through said diaphragm and into the meat;
    the improvement wherein the meat is tightly confined in a sealed tunnel space during use of the apparatus, said tunnel space having movable metal end walls.

9. The method of claim 7, wherein an air gap is provided downstream of the meat from the direction of travel of the shock wave, whereby a tension or rarefaction wave is produced.

10. In a method of tenderizing meat and/or killing microbes in meat, comprising
    subjecting at least one piece of meat to a shock wave propagated through an incompressible fluid, wherein said at least one piece of meat is placed adjacent a first surface of a diaphragm having an acoustic impedance approximately the same as the acoustic impedance of said incompressible fluid, said incompressible fluid lying adjacent a second surface of said diaphragm, said diaphragm separating said meat from said incompressible fluid; and wherein movement of said at least one piece of meat is restricted when subjected to said shock wave passing through said non-compressable fluid and then said diaphragm and into said meat;

the improvement wherein the diaphragm is above the at least one piece of meat and the shock wave passes downwardly through the diaphragm and into the at least one piece of meat.

11. In an apparatus suitable for the method of claim 10, comprising a chamber for containing an incompressible fluid having a first acoustic impedance, and a device for generating a shock wave within the incompressible fluid in said chamber;

the diaphragm being disposed adjacent said chamber, said diaphragm having one surface adapted to be in contact with the incompressible fluid within said chamber when said apparatus is in use, said diaphragm having an opposite surface adapted to be in contact with the meat when the apparatus is in use, and said diaphragm having an acoustic impedance approximately the same as said first acoustic impedance; and structure for restraining excessive movement of the meat when subjected to a shock wave passing through the incompressible fluid and then through said diaphragm and into the meat;

the improvement wherein said diaphragm and said chamber are disposed above the meat when the apparatus is in use, whereby the shock wave passes downwardly through the diaphragm and into the meat during use of said apparatus.

12. The apparatus of claim 11, wherein an air gap is provided downstream of said meat, said air gap constituting means to produce a tension of rarefaction wave.

13. The apparatus of claim 12, wherein said air gap has a height of at least 1.9 cm and is backed by metal plate.

* * * * *